(12) United States Patent
Billings

(10) Patent No.: US 10,679,299 B2
(45) Date of Patent: Jun. 9, 2020

(54) MACHINE LEARNING RISK FACTOR IDENTIFICATION AND MITIGATION SYSTEM

(71) Applicant: Midwest Employers Casualty Company, Chesterfield, MO (US)

(72) Inventor: Brian Andre Billings, Wildwood, MO (US)

(73) Assignee: Midwest Employers Casualty Company, Chesterfield, MO (US)

( * ) Notice: Subject to any disclaimer, the term of this patent is extended or adjusted under 35 U.S.C. 154(b) by 273 days.

(21) Appl. No.: 15/686,420

(22) Filed: Aug. 25, 2017

(65) Prior Publication Data

US 2017/0352105 A1    Dec. 7, 2017

Related U.S. Application Data

(63) Continuation of application No. 14/464,288, filed on Aug. 20, 2014, now abandoned.

(51) Int. Cl.
*G06Q 40/00* (2012.01)
*G06Q 40/08* (2012.01)

(52) U.S. Cl.
CPC .................. *G06Q 40/08* (2013.01)

(58) Field of Classification Search
CPC ......... G06Q 50/22; G06Q 40/08; G06Q 40/00
See application file for complete search history.

(56) References Cited

U.S. PATENT DOCUMENTS

| | | | |
|---|---|---|---|
| 8,117,043 B2 | 2/2012 | Hu et al. | |
| 8,244,654 B1 | 8/2012 | Hobgood et al. | |
| 8,332,234 B1 | 12/2012 | Armentano et al. | |
| 8,473,311 B2 | 6/2013 | McGuigan et al. | |
| 8,515,788 B2 | 8/2013 | Tracy et al. | |
| 8,521,555 B2 | 8/2013 | Adams et al. | |
| 8,543,428 B1 | 9/2013 | Jones, III et al. | |
| 2006/0224416 A1* | 10/2006 | Lloyd .................... | G06Q 10/10 705/2 |
| 2009/0105550 A1* | 4/2009 | Rothman ............... | G06Q 50/22 600/300 |
| 2011/0082712 A1* | 4/2011 | Eberhardt, III ........ | G06Q 10/10 705/4 |
| 2012/0284052 A1* | 11/2012 | Saukas ................... | G06Q 10/00 705/3 |
| 2014/0081652 A1* | 3/2014 | Klindworth ............ | G06Q 10/10 705/2 |
| 2016/0034662 A1 | 2/2016 | Moynihan et al. | |

(Continued)

*Primary Examiner* — Mike Anderson
(74) *Attorney, Agent, or Firm* — Stinson LLP

(57) ABSTRACT

A system performing machine learning to predict and identify claims that have a high likelihood of migrating across a predetermined risk threshold and to generate intervention strategies to mitigate the likelihood of migration. The processing system includes a computer server, database engine, computer programming instructions, network connectivity, associated claims, payment, medical, pharmacy and other relevant data, a plurality of statistical and machine learning algorithms and a method for electronically displaying and attaching the results to a business process. The system will use all available data to analyze the medical treatment pattern of a claimant and based on automated findings make recommendations as to appropriate interventions to positively impact claims costs.

6 Claims, 10 Drawing Sheets

(56) References Cited

U.S. PATENT DOCUMENTS

2016/0034664 A1   2/2016   Santos et al.
2016/0048766 A1*  2/2016   McMahon .............. G06N 5/047
                                                706/12

* cited by examiner

FIG. 9

| Non-Pharmacological Treatment Risk Factors ⇅ | Pharmacological Treatment Risk Factors ⇅ | Claimant Biological Risk Factors ⇅ | Claimant Psycho-Social Risk Factors ⇅ | Lost Time Risk Factors ⇅ | Regulatory/ Legal Risk Factors ⇅ | Risk Score ⇅ | Change in Risk Score ⇅ |
|---|---|---|---|---|---|---|---|
| ⊗ | ⊘ | ⊖ | ⊘ | ⊖ | ⊖ | 99.41 | Flat |
| ⊗ | ⊘ | ⊖ | ⊘ | ⊖ | ⊖ | 98.90 | Flat |
| ⊖ | ⊘ | ⊗ | ⊖ | ⊗ | ⊖ | 98.86 | Increase |
| ⊘ | ⊗ | ⊖ | ⊘ | ⊖ | ⊘ | 98.77 | Increase |
| ⊗ | ⊗ | ⊘ | ⊘ | ⊘ | ⊖ | 98.77 | Increase |
| ⊖ | ⊖ | ⊗ | ⊘ | ⊖ | ⊖ | 98.36 | Flat |
| ⊗ | ⊗ | ⊖ | ⊘ | ⊖ | ⊖ | 98.26 | Flat |
| ⊗ | ⊘ | ⊖ | ⊘ | ⊖ | ⊖ | 98.04 | Flat |
| ⊘ | ⊗ | ⊖ | ⊘ | ⊖ | ⊖ | 97.92 | Increase |
| ⊗ | ⊘ | ⊖ | ⊘ | ⊖ | ⊖ | 97.75 | Flat |
| ⊗ | ⊘ | ⊖ | ⊘ | ⊖ | ⊖ | 97.69 | Decrease |
| ⊗ | ⊘ | ⊖ | ⊘ | ⊖ | ⊖ | 97.64 | Increase |
| ⊖ | ⊘ | ⊖ | ⊘ | ⊖ | ⊖ | 97.52 | Flat |
| ⊖ | ⊖ | ⊘ | ⊘ | ⊖ | ⊖ | 97.29 | Flat |
| ⊖ | ⊘ | ⊗ | ⊘ | ⊖ | ⊖ | 97.26 | Flat |
| ⊖ | ⊘ | ⊖ | ⊘ | ⊖ | ⊖ | 97.19 | Increase |

FIG. 10

| Lost Time Risk Factors | Regulatory/ Legal Risk Factors | Risk Score | Change in Risk Score |
|---|---|---|---|
| ! | ! | 99.41 | Flat |
| ! | ! | 98.90 | Flat |
| X | ! | 98.86 | Increase |

MACHINE LEARNING RISK FACTOR IDENTIFICATION AND MITIGATION SYSTEM

CROSS-REFERENCE TO RELATED APPLICATION

This application is a continuation of co-pending U.S. patent application Ser. No. 14/464,288, filed Aug. 20, 2014, the entire disclosure of which is incorporated herein by reference for all purposes.

BACKGROUND

Aspects of this invention relate to a computerized assessment and recommended intervention for high risk workers' compensation claims and, more specifically, to applying machine learning technologies to data and delivering results via electronic means over a computer network in an effort to identify and mitigate costs associated with high risk workers' compensation claims.

The American workers' compensation system is a no-fault scheme that has been implemented by each of the fifty states. While each state's law may vary from that of another state, all states share the same basic concepts: (1) if an employee is injured at work, the employer must provide defined benefits (medical, indemnity (lost wages) and disability) regardless of fault and (2) the employer is immune from a tort lawsuit by the employee on account of the employee's work injury. Generally, most states allow employers to insure their obligations to provide workers' compensation benefits through, for example, a primary insurance policy that provides first dollar coverage, a large deductible policy, a state managed fund, or a self-insurance program. Employers that are allowed to self-insure their workers' compensation liabilities are generally required to purchase some type of excess insurance that provides coverage for claims that exceed a self-insured retention (SIR).

As medical and pharmaceutical technology has advanced, so have the expenses associated with these treatments. In addition, medical cost inflation has also aggressively trended upward over the last several decades. It is well known that medical expenses per capita in the US far exceed other industrialized nations. Not unexpectedly, in the last decade, the primary expense associated with workers' compensation claims has dramatically shifted from lost wages to medical and pharmaceutical related expenses. Currently, medical and pharmacy expense make up, on average, 60% of the total costs in workers' compensation claims. Understanding these trends coupled with predicting and early intervention on high risk claims is paramount to tackling the problem of medical cost inflation and over utilization in workers' compensation claims.

Given the shift to medical related claim's expenses and the medical cost trends in the United States, workers' compensation insurers are acutely aware of the need to better manage claim's related medical costs. On complex claims, human adjusters must plow through voluminous medical records to understand the medical cost drivers on a claim and formulate a plan to mitigate claims costs. An automated approach to such review would drastically reduce time to identify and intervene on problem claims.

Workers' compensation claims can be classified into two broad categories—Medical Only and Indemnity claims. Medical only claims incur limited medical costs, no lost wage costs, and then close. Indemnity claims involve injuries that cause the employee to be out of work for a period of time. While most injured employees return to work, some do not. Those who do not return to work receive workers' compensation benefits for life or for a substantial period of time. Some injuries are catastrophic and are known to be high risk at claim outset. This class of claim would include injuries such as death, some amputations, serious burns, brain injuries and paralysis. These claims are assigned to only experienced adjusters and nurse case managers.

Although some claims are readily identifiable from the outset as high risk, a large percentage of high cost claims can be labeled as migratory claims. A migratory claim appears to be much like a normal risk claim and then medical conditions gradually worsen over time. For example, initially, a low back strain may result in lost time, limited medical treatment, and dispensing of pharmaceuticals. However, the normal claim can migrate to high risk if the claimant continues to experience pain and opts for a costly surgical intervention. In a typical migratory large loss claim, the claimant will have multiple surgeries over an extended period of time and likely end up on a cocktail of high-powered addictive drugs. Without a different medical treatment protocol, this pattern will repeat over and over incurring hundreds of thousands even millions of dollars in costs.

The workers' compensation insurance industry and, in particular, self-insured employers and their excess carriers, have been slow to adopt automation. While automation has occurred, most of it has centered on workflow for handling claims and sending alerts when red flags appear on a claim. Further, conventional approaches lack the ability to effectively predict migratory claims. At most, current implementations merely include rudimentary models based on the summation of red flags to generate a single risk score. An automated approach for the accurate and early identification of such claims and for suggesting intervention techniques would greatly improve existing manual processes to identify migratory claims.

SUMMARY

Briefly, aspects of the present invention permit quickly and accurately predicting claim outcomes by applying statistical and/or machine learning techniques not only for scoring claims at their inception but also for migratory claims. Moreover, aspects of the invention provide fully integrated scoring engines to automatically generate predictions, store predictions, validate ongoing model performance, allow for automated model retraining, and electronically deliver the results. Advantageously, aspects of the invention facilitate targeted interventions based on the predictions to mitigate the risk of migratory claims.

One aspect of the present invention comprises a system for an automated claim risk factor identification and mitigation system.

In another aspect, software instructions are stored on one or more tangible, non-transitory computer-readable media and are executable by a processor.

In yet another aspect, a processor executable method is provided.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

FIG. 9 is an exemplary screenshot depicting contents of the prediction report according to one embodiment of the invention.

FIG. 10 is an exemplary screenshot depicting contents of the prediction report in further detail according to one embodiment of the invention.

Corresponding reference characters indicate corresponding parts throughout the drawings.

DETAILED DESCRIPTION

Figure 1:
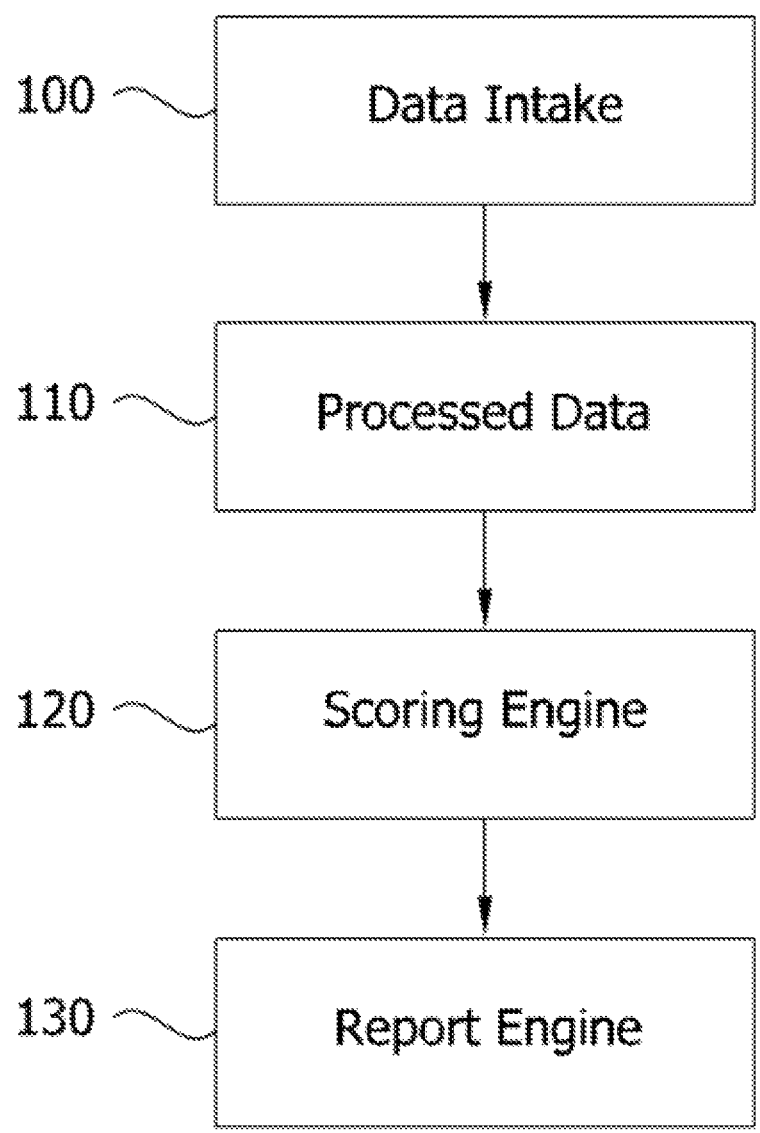
FIG. 1 is a diagram depicting a system of identifying claim risk factors and suggesting intervention strategies for mitigating potential claim losses, according to one embodiment of the invention.

FIG. 1 is a diagram depicting a general overview of one embodiment of an automated claim risk factor identification and mitigation system. Aspects of the invention combine statistical and machine learning techniques along with related data to predict high risk workers' compensation claims and ultimately make suggestions as to how to mitigate ongoing claim risk. In an embodiment, the system is configured with two models—one predicting claims that could exceed $50,000 in total cost and another model that predicts whether a claim is likely to exceed the self-insured retention or deductible. It is to be understood that an unlimited number of predictive models are within the scope of the invention. Given the breadth of data, the system is capable of handling predictions on a wide range of dependent variables. The system accommodates such flexibility. The platform contains all processes necessary to automatically train, test and validate all models independently at any interval of time. This includes the ability to automatically train, test, and validate a model at a frequency that is responsive to unexpected changes to model performance metrics data 581.

The models in this embodiment predict a binary indicator—High Risk/Normal Risk with an indication of fit. The prediction data is stored along with all input data every the time model scoring is run. This embodiment accommodates up to "N" models, wherein the models are configured to run both independently (in serial or parallel execution) and in tandem (in serial execution) depending on needs. The model output is stored for all executions of each model and further summarized for presentation via a network connected online reporting tool. The online tool reports claim level prediction output including a severity ranking in a number of claim related risk factors. Elevated indications in certain risk factors are tied to specific interventions. For example, a high risk indication in a Pharmacological Risk Factor generates an intervention of Seeking a Pharmacy Benefit Manager. It is this automated intervention strategy coupled with the identification of high risk claims (and particularly high risk claim factors) using multiple predictive models that provides improved predictions and mitigation of high risk claims in accordance with aspects of the invention.

Referring further to FIG. 1, the automated claim risk factor identification and mitigation system comprises four components that will be described in greater detail below. The components refer to software objects in one embodiment, or processes invoked by the software objects in alternative embodiments. A data intake component 100 comprises a process that retrieves and/or accepts workers' compensation claims data, payment data, medical data, pharmacy data, and data from other sources that are eventually applied to a model to be used in the system. In alternative embodiments, the sources include but are not limited to U.S. census data, Social Security disability data, state regulatory issues, medical coding data, pharmacy databases, chronic condition and co-morbidity data, etc. A processed data component 110 refers to a database used by the system to house relevant data and to construct model-ready data for scoring.

In FIG. 1, a scoring engine component 120 is preferably an automated scoring engine operating in accordance with aspects of the invention. As will be described in greater detail below, the scoring engine 120 also contains an automated variable creation component, which is a process that creates variables by statistical techniques or other binning techniques, for use by the process model. Further, the scoring engine 120 contains one or more predictive models. In one alternative embodiment, two models are housed. A first model is based on a neural network, and predicts whether a claim is likely to exceed $50,000 in total paid. The other is based on a logistic regression model and determines whether a claim is likely to exceed a self-insured retention or deductible. Additionally, scoring engine 120 stores incoming scoring data, an unlimited number of predictive models, execution logs, model validation data, and current or historical scored claims. And a prediction database and report component, i.e., a report engine 130 houses several components that serve to supplement the output from scoring engine 120, and to present the output to a user.

Figure 2:
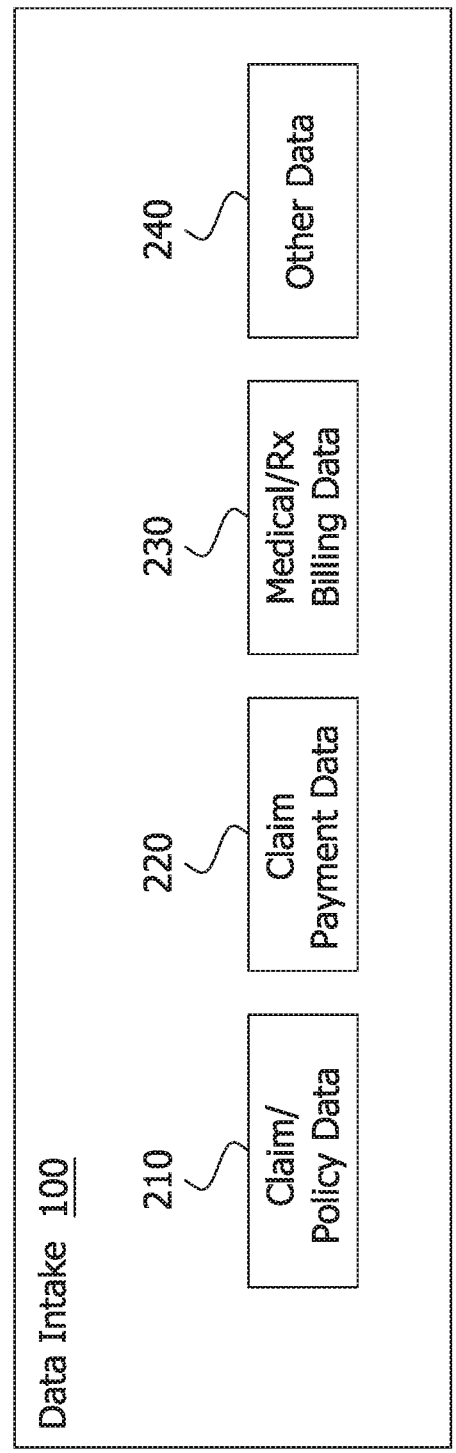
FIG. 2 is an exemplary flowchart depicting the data intake component in further detail according to one embodiment of the invention.

FIG. 2 depicts a detailed view of the data intake component 100 in accordance with one embodiment of the invention. The data intake component 100 comprises a data intake process that is made up of two processes. A first process combines an extract, transform and load (ETL) process to bring raw data files into a SQL database engine. After loading to the database, a second process validates the data using check routines to ensure quality and completeness. Claims or policy data 210, claim payment data 220, and medical and/or prescription billing data 230 is matched so that proper connections are established between the different data types. Alternative embodiments provide for various categories of data quality checks, including but not limited to: a) ensuring the claim and medical data belong to a known policy serviced by the provider, b) ensuring certain data fields are NOT NULL or correctly populated, c) eliminating duplicates, and/or d) ensuring proper connections between claim and medical bill data. In an alternative embodiment, various forms of other data 240 are similarly matched so that proper connections are established between the different data types. This ensures that each data type is connected to the proper claim.

Figure 3:
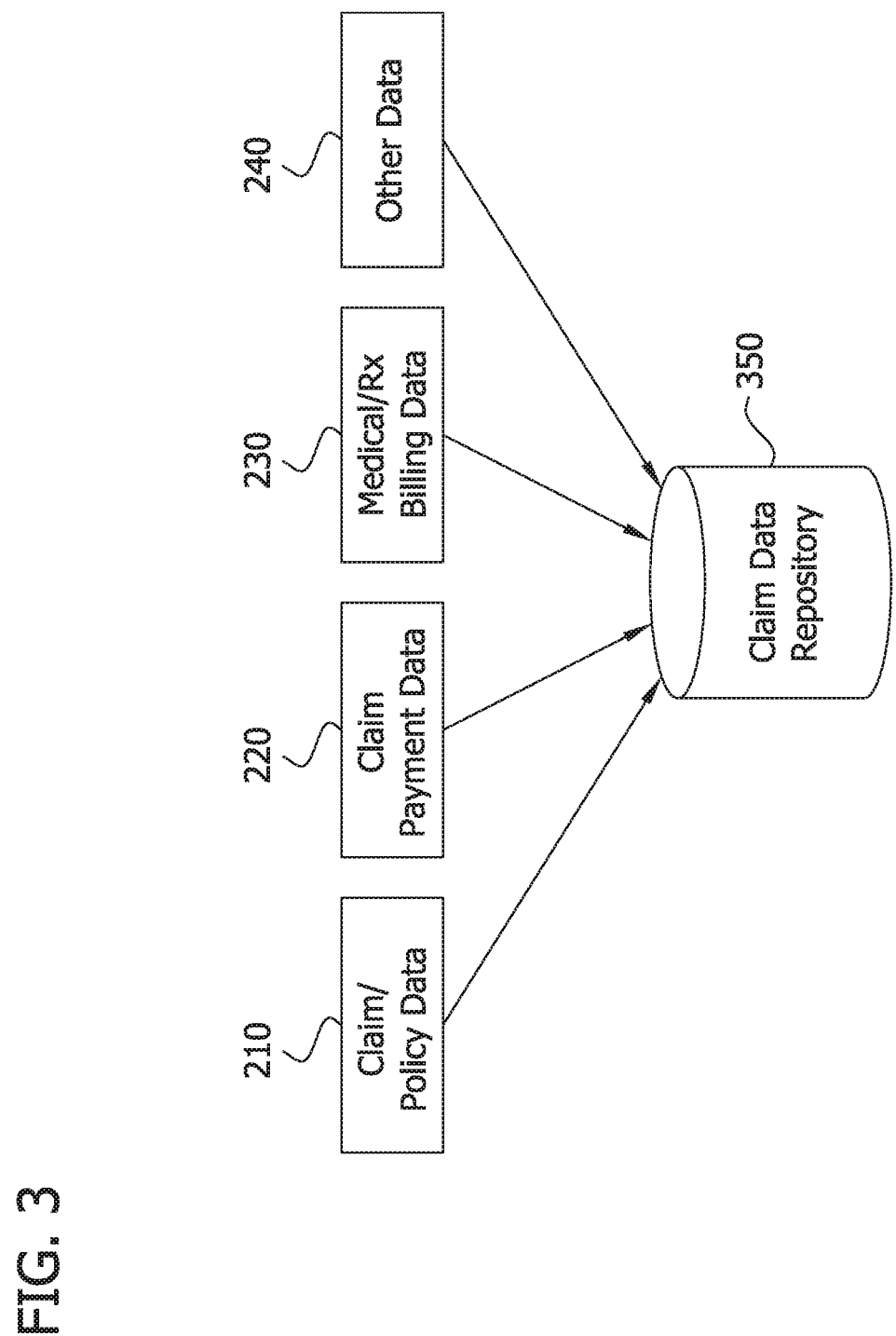
FIG. 3 is an exemplary flowchart depicting the processed data component wherein various forms of data are stored in a repository according to one embodiment of the invention.

FIG. 3 depicts a detailed view of the processed data component 110 in accordance with one embodiment of the invention. After the data is validated by data intake component 100, the validated data is then loaded to a claim data repository 350 for analysis and model scoring. The claim data repository 350 is, for example, a SQL database comprised of all the claim, payment and medical data that has met the requisite quality checks. In addition, this database houses certain cross-reference tables necessary for analysis and model scoring. These additional tables include, for example, medical coding cross-references, pharmacy data, jurisdictional risk data, etc. Notably, the claim data repository 350 contains an evidence based medical treatment crosswalk for comparison to medical bill data. This SQL database serves as the core repository of claims data utilized by the models. The loaded and validated data in claim data repository 350 comprises the claims or policy data 210, claim payment data 220, and medical and/or prescription billing data 230 in one embodiment of the invention. In an alternative embodiment, the loaded and validated data comprises other data 240.

In alternative embodiments, the cross-reference tables made available by claim data repository 350 are standard to the industry; examples include the NCCI Part of Body, Nature of Injury, and Cause of Injury cross-reference tables. In other alternative embodiments, the cross-reference tables are widely available, but not known to be used widely in the industry. For example, the HCUP comorbidity and chronic condition databases (available at: http://www.hcup-us.ahrq.gov/tools_software.jsp) is implemented in the database in one alternative embodiment. As a further example, a U.S. census database is implemented to impute socio-demographic details about each claimant.

Figure 4:
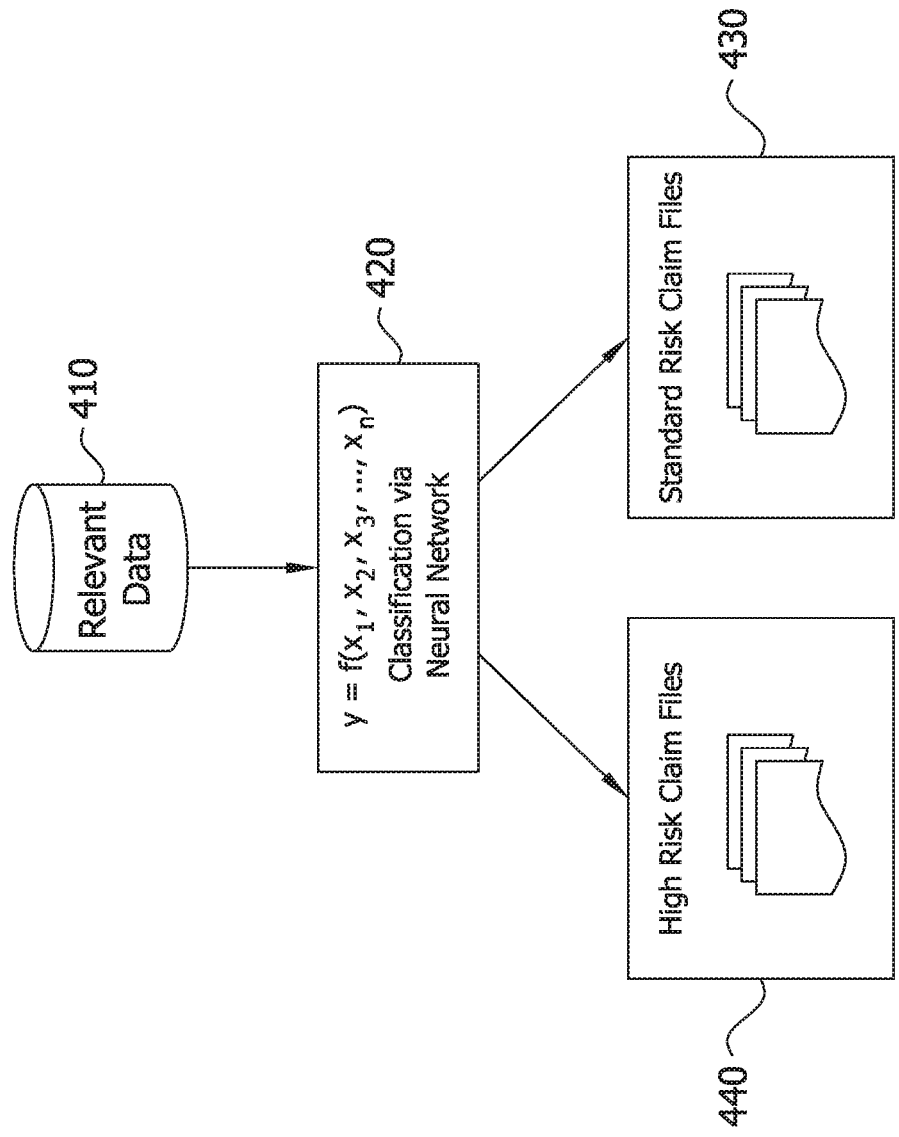
FIG. 4 is an exemplary flowchart depicting a generalization of the scoring engine component according to one embodiment of the invention.

FIG. 4 depicts a more detailed view of scoring engine component 120 in accordance with an embodiment of the invention. The scoring engine 120 receives necessary relevant data 410 from the claim data repository 350. A model 420 serves to score and classify the necessary relevant data 410. The model 420 depicted here indicates, for example, classification is implemented using a machine learning or "neural network" model. All open claims are processed and stored for archival and analysis, represented by historical scored open claim data 574, and scored open claim data 572 is pulled by the prediction database 820 of FIG. 8. Claims identified as standard risk 430 are not processed further, while claims identified as high risk 440 are passed along to the report engine 130 for further processing.

Figure 5:
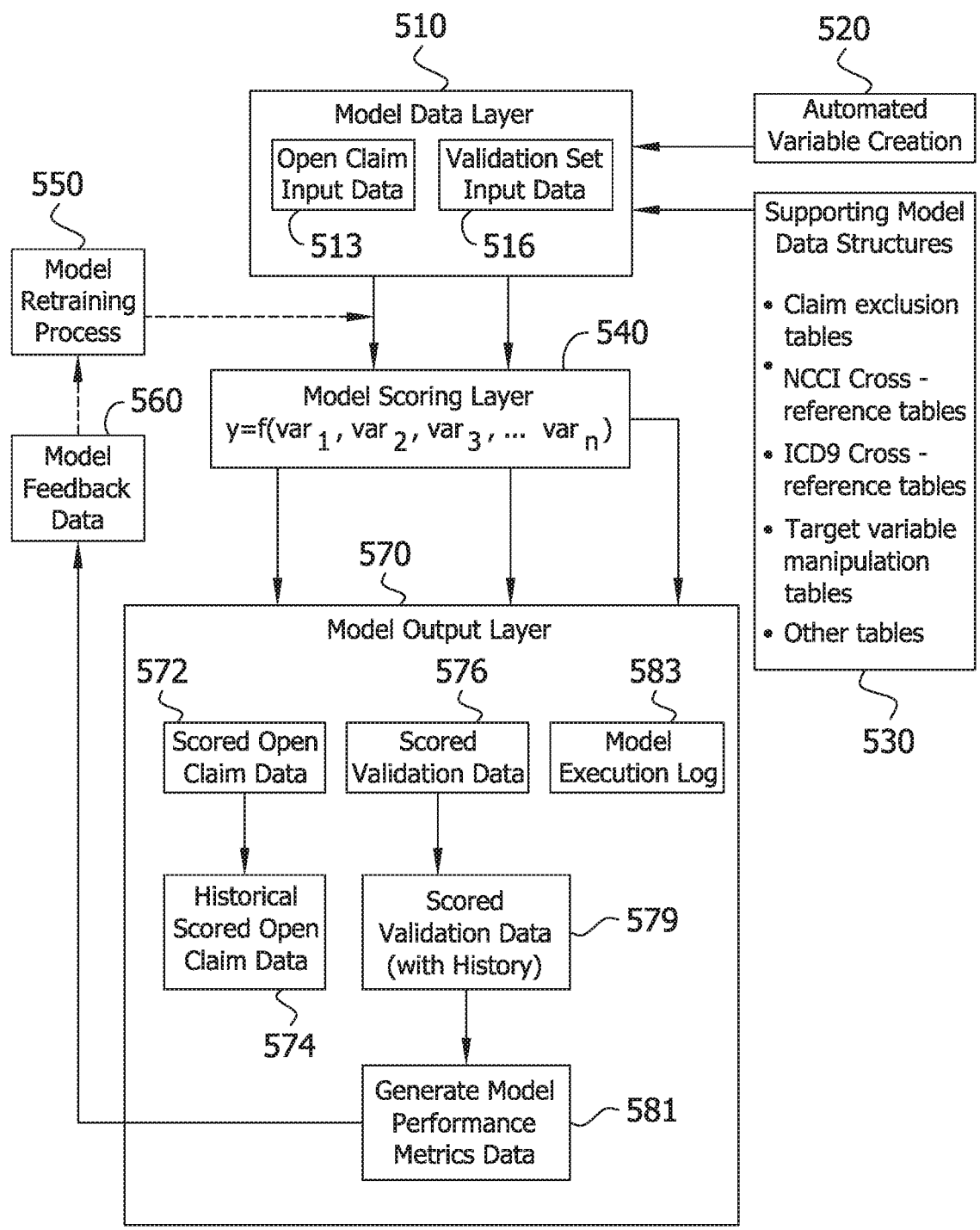
FIG. 5 is an exemplary flowchart depicting a detailed view of the scoring engine component according to one embodiment of the invention.

FIG. 5 depicts a further detailed description of several components related to the scoring engine component 120. As shown, the scoring engine 120 includes a model data layer 510, an automated variable creation component 520, supporting model data structures 530, and a model scoring layer 540. According to aspects of the invention, the automated variable creation component 520 comprises a process that creates variables by statistical techniques, or other binning techniques, for use by the process model or process models implemented by the scoring engine 120. Variable selection and construction is a key component of building successful predictive models. Certain variables contain information that can be binned based on importance with respect to the dependent variable. Assessing the importance of a given variable is particularly important where the cardinality for a particular SQL field is large. For example, in one embodiment, one ICD9 code, indicates more importance ("risk") than another ICD9 code in a given model predicting total claim cost. In alternative embodiments, the same ICD9 code, when applied in different models, has completely differently levels of risk. Therefore, it is imperative that this relative importance is tuned for a specific model.

In an embodiment, the automated variable creation process 520 automatically takes an individual ICD9 code and generates an importance score with respect to a dependent variable given to the process. However, this process is not limited to scoring only the ICD9 code variables. Thus, other variables are also scored in this manner in alternative embodiments. The scores generated by this process become part of the variables utilized in the predictive models. Preferably, standard data mining techniques are utilized to produce this score such as binning. In alternative embodiments, "riskiness" related to a particular variable, for example an ICD9 code variable, is derived from data that serves as the foundation of automated variable creation process 520. In additional alternative embodiments, a process automatically generates a score for a variable that is passed to the model used by scoring engine 120. In still other alternative embodiments, various tables also exist within the scoring engine component 120 are invoked by the model data layer 510 as supporting model data structures 530 comprising reference resources such as claim exclusion tables, NCCI cross-reference tables, ICD9 cross-reference tables, target variable manipulation tables, and other tables.

Still referring to FIG. 5, the scoring engine 120 can be broadly defined as a collection of processes and data used to generate, store, and validate predictions. This process extracts data (i.e., the relevant data 410) from claim data repository 350 for transformation into a model scoring record. A "model scoring record" represents all relevant predictive variables summarized at the claim level with a corresponding dependent variable (variable for prediction) when such record is used for training, testing and validation. A model scoring record will not have a dependent variable when presented to the predictive model for scoring. Each model will have its own set of input variables used for prediction. A model record is constructed utilizing the source data from claim data repository 350 and the application of model specific data that was created by the automated variable creation process 520 and/or other processes 530. Once built, the model scoring record is stored for subsequent scoring by the predictive model. The scoring process is run, whereby the model scoring records are scored utilizing the respective model. As part of the same process, the model also scores updated diagnostic data ("validation data") to benchmark model performance.

Each model has its own model database that contains data and electronic program code for transforming the raw data into model scoring records. In addition, each model database will contain the logic and data necessary to automatically train, test and if necessary validate the model based on feedback as indicated by model retraining process 550 and model feedback data 560.

In an embodiment, all of the resulting model scoring records and associated scoring data are written out to SQL database tables in a model output layer 570 for storage and analysis.

With respect to the automated variable creation process 520 as used in the model scoring engine 120, alternative embodiments provide for a number of transformations to be performed to data that results in an enhanced prediction regarding the riskiness of a given claim. In one alternative embodiment, for example, ICD9 code data is transformed in various ways. First, for example, groups of ICD9 codes are arranged into high risk workers' compensation injury classifications—Back and Thoracic, Knee, Shoulder, Burns, Reflex Sympathetic Dystrophy Syndrome, Pain, Diabetes, etc. However, this classification process groups ICD9 codes into certain injury types and not all ICD9 codes in a given classification are created equal with respect to riskiness. In this manner, the medical data from claims is leveraged to better understand the riskiness of a given ICD9 within a certain classification. In alternative embodiments, various other forms of data are transformed in various ways to render an enhanced prediction regarding the riskiness of a given claim.

As mentioned when describing the scoring engine component 120 in FIG. 1, in an embodiment, the model scoring engine collectively refers to the input data, the model training/testing/validation processes, the resulting predictive models and the generated output data. In an embodiment, the general component parts of scoring engine 120 are: the model data layer 510, which contains the data and transformations used to prepare for model scoring; the model retraining process 550, which is an automated mechanism to retrain a model with new or updated data; the model scoring layer 540, which provides an application of a specific model to its related model data. In addition, scoring engine 120 includes a model output layer 570 for the data captured as a result of processing in the model scoring layer 540.

Referring further to the model data layer 510, to enable automated scoring, the data presented to the respective predictive model must be properly transformed. For each model, a model scoring record is defined. The scoring engine 120 consumes data from the claim data repository 350 for non-closed claims and writes open claim input data 513 which is used to construct model scoring records for the non-closed claims. In addition, training, testing and validation model scoring records are also created, supplemented in an alternative embodiment by validation set input data 516. Some models employ automated random or other sampling techniques to balance the training, testing, and validation model scoring records according to aspects of the invention. Preferably, every time the scoring engine 120 is executed, the model data layer 510 for that model is refreshed with the most current claim information.

Still referring to FIG. 5, the model retraining process 550 will now be described in greater detail. The model scoring engine 120 contains the ability to individually train/retrain each model. Every predictive model performing classification or regression must be initially trained with model scoring data that has the dependent variable present. The scoring engine 120 is utilized to train each predictive model prior to its first scoring execution. Moreover, scoring engine 120 is capable of automatically retraining and testing each model as part of the scoring process. This ability forms a core of a true machine learning process. In this manner, the scoring engine 120 can dynamically adapt its predictive models as new data, representing changing circumstances, enters the system.

In the model scoring layer 540, trained models and the associated training and testing data are stored as objects inside a component of the database engine. These objects are created as a result of the implementation platform. It is not necessary that the models be stored as database objects. Each model can be referenced as function call whereby the function is passed a model scoring record and the function returns the original model scoring record plus a prediction and an indication of certainty about that prediction. In operation, model scoring layer 540 scores open claims as well as validation model scoring records. The scoring of validation data is performed in an effort to understand model performance over time.

Referring now to model output layer 570, the model scoring layer 540 preferably hands its data to model output layer 570 for storage in database tables. This includes scored open claims 572, scored validation data 576, and metadata generated by the execution of scoring engine 120 (e.g., date/time stamps, step identifiers, errors, etc.). Both the scored claims and the validation claims have current and historical tables. In an embodiment, the scored open claims are stored as historical scored open claim data 574 and the scored validation claims with history are stored as scored validation data 579. In an embodiment, model output layer 570 includes a model execution log 583 as illustrated in FIG. 5.

In an embodiment, scoring engine 120 retains the prediction along with the model scoring record for each of the open claims and validation data. In an embodiment, model output layer 570 also catalogs a confusion matrix for assessing the effectiveness of the learning. The confusion matrix is based on the last execution of the model using the validation data. The validation set input data 516 is used when cataloging the confusion matrix. In another embodiment, the confusion matrix is captured historically.

As described above, scoring engine 120 is configured to implement various predictive models. In an embodiment, scoring engine 120 uses one or more predictive models, alone or in combination. A detailed summary of each exemplary model is provided in Appendix A and Appendix B, respectively. Appendix A sets forth a first model, MdlTRI-AGEINT001, which identifies claims that are more likely to exceed the self-insured retention or deductible. Appendix B sets forth a second model, MdlTRIAGEEXT001, which identifies claims that are likely to exceed a cap, such as $50,000 in total cost. It should be apparent that the predictive models are used, in part, to identify claims at different points in a claim's lifecycle. For example, mdlTriage-INT001 is looking for claims that have the potential to breach the self-insured retention. The model mdlTRIAGE-EXT001, on the other hand, is trained to identify a claim that is likely to exceed $50,000 in total expenses. An appearance on a prediction report generated by the report engine 130 of FIG. 1 is an indication that a given claim is classified as elevated risk. Thus, inclusion on a report produced by the report engine 130 alerts a claim's analyst to review the treatment pattern for a given claim and develop an appropriate action plan based on the automated recommendations.

Figure 6:
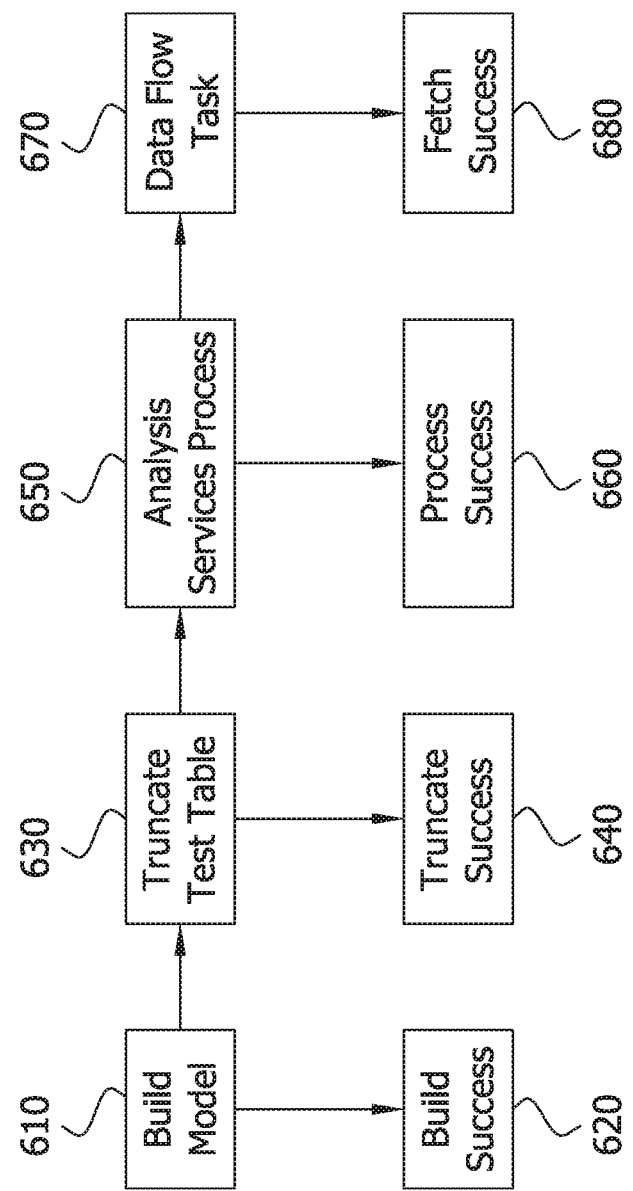
FIG. 6 is an exemplary flowchart depicting a model training/retraining process used by the scoring engine component according to one embodiment of the invention.

FIG. 6 depicts the model training/retraining process 550 used by scoring engine 120 in accordance with an embodiment of the invention. The SQL Server Integration Services training package, which is a part of the SQL Server 2008 R2 Database Platform, provides a suitable implementation of model training/retraining process 550. The R2 Database Platform provides higher level tools that reduce the need for programming, and it is important to note that the services provided by this platform may be implemented in other languages and platforms with equal effectiveness. In this embodiment, the entire predictive model automation process is constructed utilizing a combination of the SQL Server Database Engine, SQL Server Integration Services Packages and models and predictive model objects stored in SQL Server Analysis Services.

As shown in FIG. 6, beginning at 610, a list of claims used to train the model is rebuilt. Step 620 indicates that the list was successfully rebuilt. In a preprocessing step, the list of claims used in a TEST set to evaluate the performance of the model is cleared from the mining structure during a truncate test table step 630 and indicated at 640 when successfully completed. The mining structure and mining models are reprocessed during an analysis services processing step 650. This step includes loading the new claims from the rebuilt list of claims in the build model step 610 into the mining structure. A random 30% of the data from these new claims are held out from the previously mentioned TEST set. Also, retraining of the model occurs during the analysis services processing step 650 based on the remaining 70% of new claims from the build model step 610. The TEST set now stored in the mining structure from the analysis services processes step 650, if successful at 660, is written to a database table during a data flow task step 670 and indicated at 680 as successful.

Figure 7:
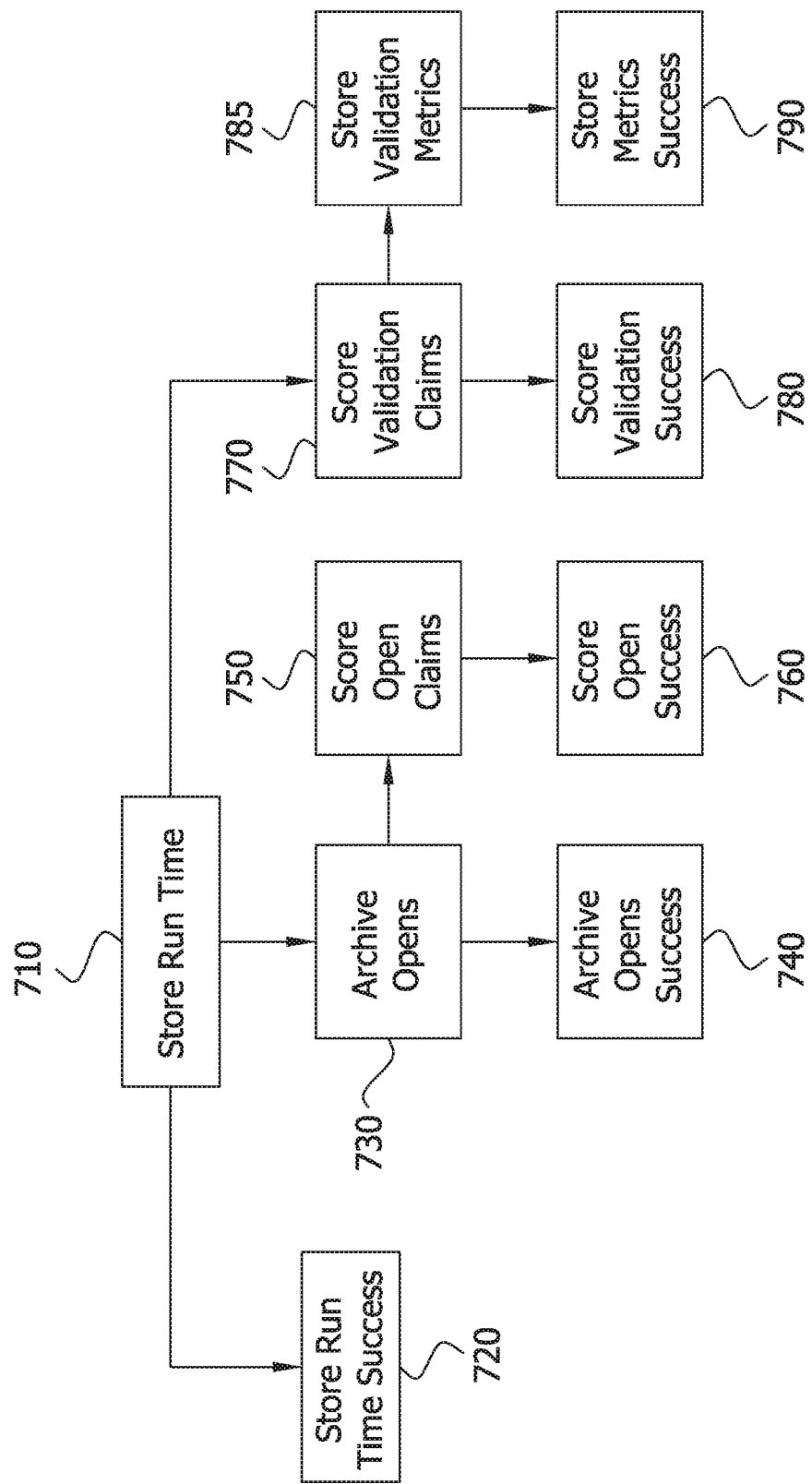
FIG. 7 is an exemplary flowchart depicting a model scoring layer in greater detail according to one embodiment of the invention.

FIG. 7 depicts an embodiment of the model scoring layer 540 in greater detail, as implemented in the previously mentioned SQL Server Integration Services training package. As depicted, a store run time step 710, indicated at 720 when successful, controls an archive opens step 730, indicated at 740 when successful. As shown, from the archive opens step 730, operations proceed to a score open claims step 750 to track and archive the status of open claims. Success of the score open claims step 750 is indicated at 760.

The store run time step 710 further controls a score validation claims step 770, indicated at 780 when successful. Model performance is checked over time in the score validation claims step 770 as well as a store validation metrics step 785, indicated at 790 when successful. To verify that a given model is performing as expected, certain test cases, termed a "validation set," are pulled out of the general population of claims data and scored by the models. The validation set changes over time to include new claims that have recently closed or met some other criteria. The output of the model is checked against reality by tracking the costs associated with a given claim. Since the claim's outcome is known, scoring the associated model record will lead to either an accurate or inaccurate prediction. Data is pulled from the claim data repository 350 depicted in FIG. 3. The validation set input data 516 depicted in FIG. 5 creates test cases. A confusion matrix is created from scored validation data 576 and then used to generate model performance metrics data 581. This data indicates whether the model is performing as expected.

Figure 8:
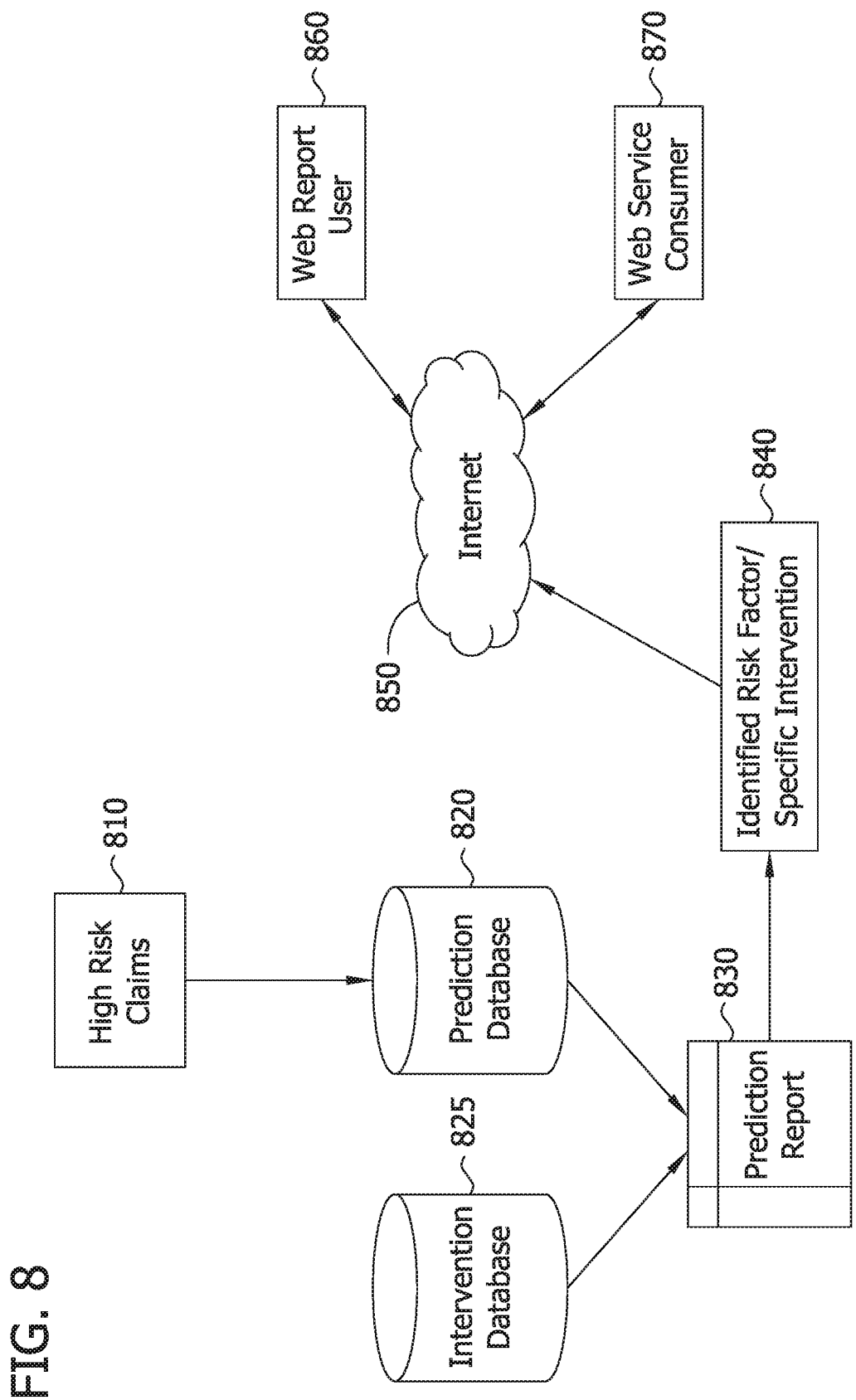
FIG. 8 is an exemplary flowchart depicting a report engine according to one embodiment of the invention.

FIG. 8 depicts the report engine 130 in further detail. Incoming claim files 810 that have been designated high risk by the scoring engine 120 are stored in a prediction database 820 and are used by a prediction report 830. An intervention database 825 maintains model interventions associated with different risks. The scoring engine 120 generates a great deal of data about an individual claim. Not only is a current prediction available, but historical predictions are also available. This is a more complete picture of an individual claim's risk than a single point estimate. In addition, the many variables that are found in the model scoring record are not always of value for deciphering what is driving claim riskiness. Organizing the model data and the entire prediction history paints a more compelling picture of claim risk factors. Thus, the data from the model output layer 570 is transformed into the prediction report 830. After the process is run, scored open claim data 572 is available for use by the prediction database 820. The data is then pulled from the prediction database 820 and is used by the report 830. The report engine 130 preferably generates a prediction report 830 that displays, for example, model variables categorized into 1 of 8 "risk factor categories" included as illustrated in Table 1:

TABLE 1

| | |
|---|---|
| Claimant Personal Risk Factors | Attributes particular to the injured worker. The severity score would consider factors such as the age and gender of the claimant as well as the claimant's tenure with the employer. |
| Claim Risk Severity | Attributes that are related to the type of injury suffered by the claimant. The severity score would consider the seriousness of the work related injury - broken arm, strained back, burned hand, head injury, etc. |
| Non-Pharmacological Treatment Risk Factors | Attributes found in the medical data that are not related to pharmacy. The severity score will consider the diagnoses that appear on medical bills as well as the medical services begin performed. |
| Pharmacological Treatment Risk Factors | Attributes found in the medical data that involve prescription drugs. The severity score will consider the types of drugs that are prescribed to the claimant. |
| Claimant Biological Risk Factors | Attributes associated with the medical bills that are related to coexisting medical conditions. Coexisting conditions are medical issues that are not necessarily related to the compensable workers compensation injury, but nevertheless appear in the medical bill data. The severity score would consider issues such as diabetes, hypertension and other similar conditions. |
| Physician Outcome (when Available) | Not available at this time. |
| Claimant Psycho-Social Risk Factors | Attributes related to the claimant's lifestyle choices and psychological related risk factors. The severity score would consider things like tobacco use, alcohol use, substance abuse, depression, post-traumatic stress disorder, etc. |
| Lost Time Risk Factors | Attributes related to the lost time expenses and estimates. The severity score considers the indemnity expenses on the claim as well as how the diagnosis codes (from the medical data) impact the expected lost time. |
| Regulatory/ Legal Risk Factors | Attributes related to the legal environment associated with the jurisdiction governing the claim. The severity score considers the jurisdictional related factors such as the ability to settle medical/indemnity and who can direct care on the claim. |

As part of the transformation into each of these "risk factor categories," in some instances, additional explanatory predictive models are utilized to grade risk in the respective category. In risk categories without a predictive model, the risk score is based on crosswalk data that identifies risk. For example, the state risk is based on a third party tool that assesses workers' compensation risk by jurisdiction. A further transformation takes the current point estimate prediction and factors in past prediction changes to give an indication of the prediction trend for each claim—Increasing, Decreasing or Flat. The trend indication allows for varying degrees of change (depending on the current prediction score relative to the previous score change) before alert of an increasing or decreasing trend is presented. This more accurately predicts whether reports a change in trend is material. Representative selections of code that perform various portions of this transformation, such as the initial selecting of data used to render the evaluation of comorbidity factors, are detailed below:

Case when $1/(1 + \exp(4.39616 + CormorbidityFlag1*(-2.46296) + CormorbidityFlag2*(-1.50739) +$ -continued $$CormorbidityFlag3^*(-1.83119) +$$
$$CormorbidityFlag4^*(-0.71518))) > 0.30 \text{ then } 3$$
$$\text{When} 1/(1 + \exp(4.39616 + CormorbidityFlag1^*(-2.46296) +$$
$$CormorbidityFlag2^*(-1.50739) +$$
$$CormorbidityFlag3^*(-1.83119) +$$
$$CormorbidityFlag4^*(-0.71518))) > 0.15 \text{ then } 2 \text{ else } 1 \text{ end}$$

The resulting data from these additional transformations are the foundation of the prediction report 830.

Referring further to FIG. 8, the prediction report 830 generated by the report engine 130 serves as the primary user interface into the prediction and intervention suggestion system. The report contains claim identification data in addition to the risk factor categories and prediction trend indication. In an embodiment, an indication of the $50,000 prediction MdlTRIAGEEXT001 appears on this report. In an alternative embodiment, a prediction and trend indication is given for the MdlTRIAGEINT001 model (likely to exceed retention model).

Most, if not all, model variable categories have interventions stored in the Intervention database 825. In some instances, an identified risk factor linked to a specific intervention as indicated at 840 can be determined based upon prediction report 830. For example, claimant personal risk factors cannot be mitigated by intervention. Likewise, regulatory and/or legal risk factors are based on the law of the jurisdiction governing the claim and, thus, cannot be changed. However, most other risk factors have specific suggested interventions. The specific suggested interventions are cataloged in intervention database 825. The design is flexible so as to support interventions for both generic and specific risk factors. There is no limit to the number of interventions that can be configured. Included below in Table 2 is an exemplary list of interventions tied to specific risk factors; a more complete description of particularly relevant interventions is described below. The interventions are based on the expert medical opinion of a medical doctor but apply generically based on the risk factor category:

TABLE 2

| | Non-Pharmacological Treatment Risk Factors | Pharmacological Treatment Risk Factors | Claimant Biological Risk Factors | Claimant Psycho-Social Risk Factors | Lost Time Risk Factors | Other Considerations |
|---|---|---|---|---|---|---|
| Interventions to consider | Utilization Review: using State-Specific Practice Guidelines/ ODG/ACO EM Practice Guidelines/ Medical Society Practice Guidelines/ Cochrane/ Others IME, Second Opinion or Chart Review with Telephonic Peer Intervention | PBM use, including formulary management, Drug Indication Review, Independent Pharmacist Evaluation +/− Telephonic Peer Intervention | IME, Second Opinion or Chart Review with Telephonic Peer Intervention | Cognitive Behavioral Therapy (CBT) Evaluation | Return to Work Program | Functional Restoration Program Evaluation |
| Rationale | Is the appropriate and best treatment being rendered? | Are the appropriate and most cost-effective drugs being used? Are the prescribed drugs related to the claim? Are there adverse events due to the drugs? | Is the appropriate and best treatment being rendered? | Could there be a psychological disorder or risk factor? Could there be substance abuse? | Are there any possible accommodations that would allow the IW to return to work? Are there other avenues for return to work, including volunteer work and specialized RTW programs? | High scores in 2 or more Risk Categories may point to the need for an intensive, multidisciplinary intervention, where physical and psychosocial concerns are addressed, with a view to restoring function, decreasing pain and reducing Rx costs |

Utilization Review (UR)—Is allowed in many jurisdictions; other jurisdictions do not address the use of UR but do not prohibit it. A consideration should be given to do formal or informal utilization review through a reputable URO in order to assess whether or not a particular course of action is supported by evidence based medical guidelines, such as those published by: States, WLDI (ODG), ACOEM, Medical Societies or independent groups such as Cochrane.

Independent Medical Evaluation (IME), Second Opinion or Chart Review with Telephonic Peer Intervention allows one to assess adequacy of diagnosis and treatment plan and suggest alternative management.

Pharmacy Benefit Managers (PBM) have many available tools to ensure appropriate and cost-effective use of prescription medications, in addition to any savings they accomplish by reducing pharmacy bills. In alternative embodiments, some of these strategies include formulary management, drug indication reviews (DIR; helps identify the appropriateness of a medication to the compensable diagnosis), independent pharmacy evaluations and more intensive programs to assess and manage prescription patterns (including telephonic peer review consultations). Modern Medical, Inc. has an excellent Opioid Defense Manager that identifies opioid overuse prospectively and intervenes at the level of the prescriber and injured worker.

Cognitive Behavioral Therapy (CBT) can help to address psychosocial risk factors that delay recovery and increase the cost of a claim. COPE, a national CBT provider group understands workers' compensation and does not use psychiatric diagnostic or billing codes. They can evaluate the patient and recommend, if appropriate, a limited intervention to help injured workers recover more quickly.

Functional Restoration Programs (FRP) are multi-disciplinary, intensive interventions that address both psychosocial factors (fear, disability mindset, catastrophic thinking, stress, anxiety) and medical factors (deconditioning, pain and opioid abuse). Their intervention is intensive (30-40 hours weekly for 2-6 weeks, depending on severity and age of the claim) and has as its aim the recovery of function, return to work, reduction in pain and elimination or decrease in the use of opioids and other medications. An evaluation lasts one to two days in one embodiment, but varies in duration in other embodiments, and can identify patients that are most likely to succeed.

Still referring to FIG. 8, in an embodiment the prediction report 830 is delivered via the Internet, shown at 850, or other suitable data communications network to web report users 860 and web service consumers 870. Not all consumers 860 of this prediction and intervention process will want to receive reporting via online. In one embodiment, consumers 860 will integrate the output into existing business systems. In other embodiments, integration is not necessary or desired. Therefore, a secure web service, for example, provides prediction report data generated by the report engine 130 to such web service consumers 870. The web service requires individualized authentication and will take a claim number or the like as input and return the contents of the corresponding prediction report 830 as an output generated by the report engine 130.

FIGS. 9 and 10 are exemplary screenshots, for illustrative purposes only, depicting contents of the prediction report according to one alternative embodiment. Risk factor categories are displayed including, for example, Lost Time Risk Factors 910 and Regulatory/Legal Risk Factors 920. A Risk Score 930 can be thought of as a certainty measure that further explains the High Risk/Standard Risk determination made by scoring engine 120. The closer this probability is to 1 the more certain the model is about the high risk prediction. The closer the probability is to 0 the more certain of a standard risk claim—with 0.5 being an exemplary transition point between high risk and standard risk. The score from the model is displayed in FIG. 9 as a probability score*100 and is in the column titled "Risk Score."

Although described in connection with an exemplary computing system environment, embodiments of the aspects of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well-known computing systems, environments, and/or configurations that are suitable for use with aspects of the invention in various embodiments include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments (such as cloud-based computing) that include any of the above systems or devices, and the like.

Embodiments of the aspects of the invention are described in the general context of data and/or processor-executable instructions in various embodiments, such as program modules, stored one or more tangible, non-transitory storage media and executed by one or more processors or other devices. Generally, program modules include, but are not limited to, routines, programs, objects, components, and data structures that perform particular tasks or implement particular abstract data types. In various embodiments, aspects of the invention are also practiced in distributed computing environments where tasks are performed by remote processing devices that are linked through a communications network. In various embodiments of a distributed computing environment, program modules are located in both local and remote storage media including memory storage devices.

In alternative embodiments, processors, computers and/or servers execute the processor-executable instructions (e.g., software, firmware, and/or hardware) such as those illustrated herein to implement aspects of the invention.

Alternative embodiments of the aspects of the invention are implemented with processor-executable instructions. The processor-executable instructions are organized into one or more processor-executable components or modules on a tangible processor readable storage medium in various embodiments. Aspects of the invention are implemented with any number and organization of such components or modules in various embodiments. For example, aspects of the invention are not limited to the specific processor-executable instructions or the specific components or modules illustrated in the figures and described herein. Other alternative embodiments of the aspects of the invention include different processor-executable instructions or components having more or less functionality than illustrated and described herein.

The order of execution or performance of the operations in embodiments of the aspects of the invention illustrated and described herein is not essential, unless otherwise specified. That is, in alternative embodiments, the operations are performed in any order, unless otherwise specified, and embodiments of the aspects of the invention include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that alternative embodiments include additional elements other than the listed elements.

In view of the above, it will be seen that several advantages of the aspects of the invention are achieved and other advantageous results attained.

Not all of the depicted components illustrated or described are required in alternative embodiments. In addition, alternative implementations and embodiments include additional components. Variations in the arrangement and type of the components are capable of being made in alternative embodiments without departing from the spirit or scope of the claims as set forth herein. Alternative embodiments provide that additional, different or fewer components are capable of being provided and components combined. Further, alternative embodiments provide for a component implemented alternatively or in addition by several components.

The above description illustrates the aspects of the invention by way of example and not by way of limitation. This description enables one skilled in the art to make and use the aspects of the invention, and describes several embodiments, adaptations, variations, alternatives and uses of the aspects of the invention, including what is presently believed to be the best mode of carrying out the aspects of the invention. Additionally, it is to be understood that the aspects of the invention is not limited in its application to the details of construction and the arrangement of components set forth in the following description or illustrated in the drawings. The aspects of the invention are capable of other embodiments and of being practiced or carried out in various ways. Also, it will be understood that the phraseology and terminology used herein is for the purpose of description and should not be regarded as limiting.

Having described aspects of the invention in detail, it will be apparent that modifications and variations are possible without departing from the scope of aspects of the invention as defined in the appended claims. It is contemplated that various changes could be made in the above constructions, products, and process without departing from the scope of aspects of the invention. In the preceding specification, various preferred embodiments have been described with reference to the accompanying drawings. It will, however, be evident that alternative embodiments provide for various modifications and changes to be made thereto, and additional embodiments implemented, without departing from the broader scope of the aspects of the invention as set forth in the claims that follow. The specification and drawings are accordingly to be regarded in an illustrative rather than restrictive sense.

APPENDIX A: MdlTRIAGEINT001

Predictive Model 1: Identify Claims at Risk of Exceeding the SIR/Deductible Introduction This will serve as the primary documentation for version 1.0 of the Internal WC claims triage model. The goal of this model is to identify higher risk claims in order for review by the claims department to effectively triage, specifically—

"To identify claims, for review and action by Claims Triage personnel, which have not otherwise been reported or claims that are not currently open, and the identified claim has potential large-loss exposure."

The model takes in a host of variables/features, discussed below, and outputs a probability of becoming an excess claim.

This model data resides in the MDLTRIAGEINT001 and MDLCOMMONTRIAGEINT databases on the production system. The model itself resides in TRIAGEINT001 database of the production Analysis Services database.

Claims for Inclusion in the Training Set

The training set includes: a) all open large loss claims, and b) all closed non-claims. Data deemed to have insufficient completeness of medical or pharmacy data will not be included. 80% of the claims meeting these criteria were used for training.

Claims for Inclusion in the Validation Set

The validation set has the same criteria as the training set except that is uses the 20% of the data that was not used for training data deemed to have insufficient completeness of medical or pharmacy data.

Available Features/Data Dictionary

A full set of potential training data resides in the table mdlTRIAGEINT001_Training. The features for the model can be divided into a several classes:

1. Claim and Policy variables—are sourced from claim/policy level data. Potential features in this category are listed below:
   a. Claim Administrator—the administrator's name
   c. Claim Number—Claim number assigned to the claim
   e. Claimant Name—Name of the Injured Worker
   f. Claimant's Gender—Gender of the Injured Worker
   i. Policy Number—policy number under which the claim is covered
   j. Policy Effective Date—Effective date of the policy under which the claim is covered
   k. Accident description—description of the accident
   n. Nature of Injury—NCCI nature of injury description
   o. Part of Body—NCCI part of body description
   P. Cause of Injury—NCCI cause of injury description
   q. NOI POB Severity Score—severity score based on the Nature of Injury and Part of Body NCCI categories. The scoring process is discussed below. Some are unclassified
   r. COI Severity Score—severity score based on the Cause of Injury NCCI category.
   s. Claim Status—the status of the claim (either Open/Closed or more rarely Unknown)
   t. Claim Reopen—a Boolean identifying claims that reopen. 0 is no reopen, 1 reopen.
   u. Claimant birth date—date of birth for the injured worker
   x. Date of Injury—date the accident occurred
   bb. Benefit state—identifies which state's laws govern claim benefits
   gg. Hire Date—date injured worker was hired (1-1-1900 is an unknown).
   jj. Employee job class code—code that identifies the job category of the injured worker
   aaa. Total Paid—total medical, indemnity and expense paid on a given claim
   bbb. Self-Insured Retention—the amount loss the insured retains for the claim as governed by the policy terms 2. Medical Diagnosis variables. These are sourced from ICD9 codes on the medical bills.
   q. Back Severity—Back injuries given severity scores with the newer automated process described below, using refined sets of ICD9 codes
   r. Brain Severity—for brain injuries given severity scores with the newer automated process described below, using refined sets of ICD9 codes
   s. Burn Severity—same as q. for burn injuries given severity scores with the newer automated process described below, using refined sets of ICD9 codes
   v. Knee Severity—same as q. for knee severity
   z. Shoulder Severity—shoulder injuries given severity scores with the newer automated process described below, using refined sets of ICD9 codes
   aa. Spinal Cord Severity—spinal cord injury given severity scores with the newer automated process described below, using refined sets of ICD9 codes
   ff. Comorbidity—Diabetes—a flag indicating diabetes
   h. Comorbidity—Hypertension—a flag indicating hypertension
   jj. Comorbidity Obesity—a flag indicating obesity
3. Medical Service variables are related to classified service codes source from the medical bills. They are grouped using CMS BETOS classifications.
   a. Musculoskeletal Procedure Flag—high risk musculoskeletal procedure
   d. Emergency Room Service Flag—high risk ER services
   f. Imaging Flag—flag indicating the presence of x-ray/CT or MRI scans
4. Pharmacy variables are sourced using the drug codes on the medical bills, with the drug data filled in using a cross-reference database.
   a. NSAID Flag—a flag indicating the use of NSAID drugs
   b. Opioid Flag—a flag indicating the use of opioid based pain relievers.
   c. Muscle Relaxant Flag—a flag indicating the use of muscle relaxant drugs
5. Other Model variables are derived variables
   g. Risk Category—a 'High' or 'Low' risk category based on the total paid at a threshold of 50k
   h. Total Incurred—the sum of the claim's paid losses and loss reserves Severity Scoring for NCCI and ICD9 Codes Because of the tremendous number of NCCI categories and ICD9 codes, in order to build effective models, these categories need to get grouped into a smaller subset. In order to do this, we implement a severity score as described below.

NOI/POB Severity Scoring

The NOI and POB fields interact strongly, so wherever possible we want to use both fields together to set the severity. We do this using the following algorithm:
1. If the combined NOI/POB have at least 100 claims, use the combined NOI and POB and calculate the probability of high risk.
2. If the combined NOI/POB have less than 100 claims, and either the NOI or POB individually have more than 100 claims use the probability of high risk calculated from that field. If BOTH individually have more than 100, use the higher probability.
3. If neither category has 100 claims in it, then group up the POB based on the body (toe gets grouped with foot, finders with hands, etc.) and check steps 1 and 2 with the coarse-grained POB.
4. Now that each NOI/POB has a probability of high risk associated with it, score as follows—the top x % get a score of 4, the next x % get a 3, the next x % is a 2 and the remainder is scored as a 1.

COI Severity
1. Group together COI codes based on common causes (all air/boat/motor vehicle collisions get lumped together)
2. Set the probability of high risk for each grouped COI for groups with 100 or more claims
3. Apply step 4 above.

Revised ICD9 Severity Scoring

The revised ICD9 process is used in the Diagnosis Related Variables
1. Instead of dividing into nurse driven categories use the entire set of ICD9 codes
2. For ICD9 codes with at least 100 claims, calculate the probability of high risk
3. For 5 digit ICD9 codes with less than 100 claims, group them with the 4 digit category code and assign probability that way, where possible
4. Fill in severities of 1-4 as used in the other scoring processes
5. Break the severities back into medical categories Model Validation The area under the curve measurement in R is 0.86 using the 20% holdout sample. The ratio of true positives to all actual positives is 87%. The ratio of false positives to all predicted positives is 19%.

Feature Selection

Feature selection for a model of this type is a tricky process. Several variables (i.e. the financial variables) are obviously highly correlated with expensive claims, but have to be excluded because they are unfit for an early identification model. At all times, we have tried to restrict ourselves to those variables that can show up early in a claim's lifetime.

Below is an example of the variable importance measures used to identify relevant features for the model.

| Attribute | Chi Squared Statistic |
| --- | --- |
| Self-Insured Retention | 117.949 |
| Benefit State | 84.054 |
| Comorbidity — Diabetes | 83.502 |
| Brain Severity | 29.355 |
| Musculoskeletal Procedure Flag | 20.295 |
| Opioid Flag | 15.367 |

Algorithm and Technology/Implementation:

The logistic regression was chosen as the ultimate solution. Although it performs slightly worse than the neural network, it is less of a black box and lends itself to understanding what drives predictions.

The model is mdlLogisticRegression in the mining structure mdlTRIAGEINT001 Training.

Results/Validation

The ratio of true positives to all actual positives is 89%. The ratio of false positives to all predicted positives is 17%.

In order to assess validity of the model a separate validation set has been built, mdlTRIAGEINT001_Validation, based on the description of the validation data above. The ratio of true positives to all actual positives has been running at 82-83%. The ratio of false positives to all predicted positives has been running at 21%. It is understandable that the performance against the validation data is somewhat worse since the data with insufficient completeness is included.

All scored claim results are saved in an archive table (mdlTRIAGEINT001_OpenArchive), so over time we will build up a set of data for actual historical validation of the model.

Summary of Tables mdlTRIAGEINT001_Metrics—Data for the confusion matrix of the validation set mdlTRIAGEINT001_Open—a table containing all the features of the open claims mdlTRIAGEINT001_OpenScored—a table containing the scored open claims mdlTRIAGEINT001_OpenArchive—the archive of all historical scored claims mdlTRIAGEINT001_Test—the randomly withheld test set. This is created by Analysis Services when the model is trained.

mdlLTRIAGEINT001_Training—The data available for training before splitting off the test set mdlTRIAGEINT001_Validation—the validation set consisting of the validation data as described above.

mdlTRIAGEINT001_ValidationScored—the scored validation claims. Contains all validation claims that have ever been scored mdlxRefTRIAGEINT001_COISeverity—severity scores for the COI NCCI fields mdlxRefTRIAGEINT001_ICD9Severity—severity scores using the revised ICD9 scoring process mdlxRefTRIAGEINT001_POBNOISeverity—severity scores for the NOI/POB NCCI fields tempmdlTRIAGEINT001_ClaimBenefitState—Benefit state assignment by claim tempmdlTRIAGEINT001_ClaimDiagnosisSeverity—a temporary table containing each claim and its diagnoses with severity score tempmdlTRIAGEINT001_Rx—a temporary table containing each claim and its rx fields tempmdlTRIAGEINT001_ModelSourceData—a temporary table containing the full feature set for all claims including all claims. This is the source for the mdlTRIAGEINT001_Training table.

Summary of Stored Procedures spcGetErrorInfo—a helper process that logs errors upon failure of any of the other routines.

spcmdlTRIAGEINT001_BuildOpenSet—Builds the open set from the source data spcmdlTRIAGEINT001_BuildTrainingSet—Builds the mdlTRIAGEINT001_Training table from the source data spcmdlTRIAGEINT001_BuildValidationSet—Builds the validation set from the source data spcmdlTRIAGEINT001_ClaimDiagnosisSeverity—builds the temporary medical severity table described above.

spcmdlTRIAGEINT001_ClaimExclusions—builds set of claims exclusions spcmdlTRIAGEINT001_PolicyPeriodInfo—build set of data from policy system spcTRIAGEINT001_List—builds the Rx temporary table described above.

spcTRIAGEINT001_ModelSourceData—builds the source data temporary table described above.

spcTRIAGEINT001_OpenSet—builds the open claims data. No inputs, outputs the refreshed temp tables and the mdlTRIAGEINT001_Open table spcTRIAGEINT001_TrainingSet—builds the training data. No inputs, outputs the refreshed temp tables and the mdlTRIAGEINT001_TrainingSet table SQL Server Agent Jobs mdlTRIAGEINT001_BuildAndScoreOpens—This archives the open claims, builds the new open claims and validation sets, scores them, and updates the metrics table.

mdlTRIAGEINT001_BuildTrainingSet—this trains the model by updating the training set, retraining the model, and then refreshing the table containing the test set.

SSIS Packages mdlTRIAGEINT001_BuildOpen—this package invokes the stored procedure that builds the open set mdlTRIAGEINT001_BuildTraining—this package invokes the stored procedure that builds the training set, retrains the model, and refreshes the test set mdlTRIAGEINT001_BuildValidation—this package invokes the stored procedure that builds the validation set mdlTRIAGEINT001_ScoreOpens—this package archives the opens, scores both the opens and the validation set, and calculates the confusion matrix for the validation set.

APPENDIX B: MdlTRIAGEEXT001

Predictive Model 2: Identify Claims at Risk of Exceeding $50,000 in Total Cost

Introduction

This will serve as the primary documentation for version 1.0 of the Primary WC claims triage model. The goal of this model is to identify higher risk claims in order for clients to effectively triage, specifically—

"To identify claims, for review and action by Claims Administrator personnel, which are likely to exceed $50k in total spend."

The model takes in a host of variables/features, discussed below, and outputs a probability of exceeding the 50k threshold.

This model data resides in the MDLTRIAGEEXT001 and MDLCOMMONTRIAGEEXT databases on the production system. The model itself resides in TRIAGEEXT001 database of the production Analysis Services database.

Training Set

The training set is restricted to claim administrators where we have reasonably complete data. For training we use all closed claims and those open claims that have already hit the 50k threshold.

Available Features/Data Dictionary

A full set of potential training data resides in the table mdlTRIAGEEXT001_TrainingSet. The features for the model can be divided into a several classes:

1. Claim and Policy variables—are sourced from claim/policy level data. Potential features in this category are listed below:
   a. Claim Administrator—the administrator's name
   c. Claim Number—Claim number assigned to the claim
   e. Claimant Name—Name of the Injured Worker
   f. Claimant's Gender—Gender of the Injured Worker
   i. Policy Number—policy number under which the claim is covered
   j. Policy Effective Date—Effective date of the policy under which the claim is covered
   k. Accident description—description of the accident
   n. Nature of Injury—NCCI nature of injury description o. Part of Body—NCCI part of body description
P. Cause of Injury—NCCI cause of injury description
q. NOI POB Severity Score—severity score based on the Nature of Injury and Part of Body NCCI categories. The scoring process is discussed below. Some are unclassified
r. COI Severity Score—severity score based on the Cause of Injury NCCI category.
s. Claim Status—the status of the claim (either Open/Closed or more rarely Unknown)
t. Claim Reopen—a Boolean identifying claims that reopen. 0 is no reopen, 1 reopen.
u. Claimant birth date—date of birth for the injured worker
x. Date of Injury—date the accident occurred
bb. Benefit state—identifies which state's laws govern claim benefits
gg. Hire Date—date injured worker was hired (1-1-1900 is an unknown).
jj. Employee job class code—code that identifies the job category of the injured worker
aaa. Total Paid—total medical, indemnity and expense paid on a given claim
bbb. Self-Insured Retention—the amount of loss the insured retains for the claim as governed by the policy terms 2. Medical Diagnosis variables. These are sourced from ICD9 codes on the medical bills.
   q. Back Severity—Back injuries given severity scores with the newer automated process described below, using refined sets of ICD9 codes
   r. Brain Severity—for brain injuries given severity scores with the newer automated process described below, using refined sets of ICD9 codes
   s. Burn Severity—same as q. for burn injuries given severity scores with the newer automated process described below, using refined sets of ICD9 codes
   v. Knee Severity—same as q. for knee severity
   z. Shoulder Severity—shoulder injuries given severity scores with the newer automated process described below, using refined sets of ICD9 codes
   aa. Spinal Cord Severity—spinal cord injury given severity scores with the newer automated process described below, using refined sets of ICD9 codes
   ff. Comorbidity—Diabetes—a flag indicating diabetes
   h. Comorbidity—Hypertension—a flag indicating hypertension
   jj. Comorbidity Obesity—a flag indicating obesity 3. Medical Service variables are related to classified service codes source from the medical bills. They are grouped using CMS BETOS classifications.
   a. Musculoskeletal Procedure Flag—high risk musculoskeletal procedure
   d. Emergency Room Service Flag—high risk ER services
   f. Imaging Flag—flag indicating the presence of x-ray/CT or MRI scans 4. Pharmacy variables are sourced using the drug codes on the medical bills, with the drug data filled in using a cross-reference database.
   a. NSAID Flag—a flag indicating the use of NSAID drugs
   b. Opioid Flag—a flag indicating the use of opioid based pain relievers.
   c. Muscle Relaxant Flag—a flag indicating the use of muscle relaxant drugs 5. Other Model variables are derived variables
   g. Risk Category—a 'High' or 'Low' risk category based on the total paid at a threshold of 50k
   h. Total Incurred—the sum of the claim's paid losses and loss reserves Severity Scoring for NCCI and ICD9 codes Because of the tremendous number of NCCI categories and ICD9 codes, in order to build effective models, these categories need to get grouped into a smaller subset. In order to do this, we implement a severity score as described below.

NOI/POB Severity Scoring

The NOI and POB fields interact strongly, so wherever possible we want to use both fields together to set the severity. We do this using the following algorithm:
1. If the combined NOI/POB have at least 100 claims, use the combined NOI and POB and calculate the probability of high risk.
2. If the combined NOI/POB have less than 100 claims, and either the NOI or POB individually have more than 100 claims use the probability of high risk calculated from that field. If BOTH individually have more than 100, use the higher probability.
3. If neither category has 100 claims in it, then group up the POB based on the body (toe gets grouped with foot, finders with hands, etc.) and check steps 1 and 2 with the coarse-grained POB.
4. Now that each NOI/POB has a probability of high risk associated with it, score as follows—the top x % get a score of 4, the next x % get a 3, the next x % is a 2 and the remainder is scored as a 1.

COI Severity
1. Group together COI codes based on common causes (all air/boat/motor vehicle collisions get lumped together)
2. Set the probability of high risk for each grouped COI for groups with 100 or more claims
3. Apply step 4 above.

Revised ICD9 Severity Scoring

The revised ICD9 process is used in the Diagnosis Related Variables
1. Instead of dividing into nurse driven categories use the entire set of ICD9 codes
2. For ICD9 codes with at least 100 claims, calculate the probability of high risk
3. For 5 digit ICD9 codes with less than 100 claims, group them with the 4 digit category code and assign probability that way, where possible
4. Fill in severities of 1-4 as used in the other scoring processes
5. Break the severities back into medical categories Feature Selection Feature selection for a model of this type is a tricky process. Several variables (i.e. the financial variables) are obviously highly correlated with expensive claims, but have to be excluded because they are unfit for an early identification model. At all times, we have tried to restrict ourselves to those variables that can show up early in a claims lifetime.

An example of the measures used for feature selection is given below:

| Attribute | Value | Favors HIGH | Favors LOW |
|---|---|---|---|
| Musculoskeletal Procedure Flag | 1 | 100 | |
| Back Severity | >=4 | | 88.63 |
| Comorbidity Obesity Flag | >=1 | | 86.82 |

| Attribute | Value | Favors HIGH | Favors LOW |
|---|---|---|---|
| Muscle Relaxant Flag | >=1 | 78.64 | |
| Claimant's Gender | Female | | 43.22 |
| NSAID Flag | <1 | | 26.81 |

Algorithm and Technology/Implementation:

The neural net was chosen as the ultimate solution for two compelling reasons: it had a slight edge in performance throughout the development process, and it is harder for clients to reverse engineer the probability scores it produces.

To deal with the high skew in the data, an oversampling process was used. The number of high risk claims was oversampled up to 30%. The oversampled training data is in the table mdlTRIAGEEXT001_30pOversample. The oversample percentage was chosen to accommodate a maximum false positive rate of 5%.

The model is Neural Net in the mining structure mdl-TRIAGEEXT001.

Results/Validation

The final model performs very well at its appointed task.
The final model has a confusion matrix based on the test data (in mdlTRIAGEEXT001_Test):

| Test Matrix | High Risk(actual) | Low Risk(actual) |
|---|---|---|
| High Risk (Predicted) | 91% | 5% |
| Low Risk (predicted) | 9% | 95% |

In order to assess validity of the model a separate validation set has been built (mdlTRIAGEEXT001_Validation), this consists of the 400 most recently closed claims and the 100 youngest claims to hit the high risk threshold:

| Validation Matrix | High Risk (actual) | Low Risk (actual) |
|---|---|---|
| High Risk (Predicted) | 92% | 0.25% |
| Low Risk (Predicted) | 8% | 99.75% |

All scored claim results are saved in an archive table (mdlTRIAGEEXT001_OpenArchive), so over time we will build up a set of data for actual historical validation of the model.

Summary of Tables
  mdlTRIAGEEXT001_30pOversample—Training data oversampled to a high risk pct of 30
  mdlTRIAGEEXT001Metrics—Data for the confusion matrix of the validation set
  mdlTRIAGEEXT001_Open—a table containing all the features of the open claims
  mdlTRIAGEEXT001_OpenScored—a table containing the scored open claims
  mdlTRIAGEEXT001_OpenArchive—the archive of all historical scored claims
  mdlTRIAGEEXT001_Test—the randomly withheld test set. This is created by Analysis Services when the model is trained.
  mdlTRIAGEEXT001_Validation—the validation set consisting of the 100 youngest high risk claims and 400 of the most recently closed claims
  mdlTRIAGEEXT001_ValidationScored—the scored validation claims. Contains all validation claims that have ever been scored
  mdlxRefTRIAGEEXT001_COISeverity—severity scores for the COI NCCI fields
  mdlxRefTRIAGEEXT001_ICD9Severity—severity scores using the revised ICD9 scoring process
  mdlxRefTRIAGEEXT001_POBNOISeverity—severity scores for the NOI/POB NCCI fields
  tempmdlTRIAGEEXT001_MedicalSeverity—a temporary table containing each claim and its diagnoses with severity score
  tempmdlTRIAGEEXT001_Rx—a temporary table containing each claim and its rx fields
  tempmdlTRIAGEEXT001_SourceData—a temporary table containing the full feature set for all claims, this gets broken into training and validation.

Summary of Stored Procedures
  sp_GetErrorInfo—a helper process that logs errors upon failure of any of the other routines.
  spcOVERSAMPLE—creates an oversample table. Inputs are: @TABLENAME a varchar containing the name of the input table you wish to oversample, @SOURCEFIELD the field you want to oversample on, @TARGETVALUE the value you want to oversample, @OS_PCT the percentage oversample you want, @SEED the seed for the random number generator. Output is an oversampled table.
  spcTRIAGEEXT001_MedicalSeverity—builds the temporary medical severity table described above.
  spcTRIAGEEXT001_List—builds the Rx temporary table described above.
  spcTRIAGEEXT001_ModelSourceData—builds the source data temporary table described above.
  spcTRIAGEEXT001_OpenSet—builds the open claims data. No inputs, outputs the refreshed temp tables and the mdlTRIAGEEXT001_Open table
  spcTRIAGEEXT001_TrainingSet—builds the training data. No inputs, outputs the refreshed temp tables and the mdlTRIAGEEXT001_TrainingSet table
  spcTRIAGEEXT001_ValidationSet—builds the validation data. No inputs, outputs the refreshed temp tables and the mdlTRIAGEEXT001_ValidationSet table SQL Server Agent Jobs
  mdlTRIAGEEXT001_BuildAndScoreOpens—This archives the open claims, builds the new open claims and validation sets, scores them, and updates the metrics table.
  mdlTRIAGEEXT001_BuildTrainingSet—this trains the model by updating the training set, retraining the model, and then refreshing the table containing the test set.

SSIS Packages
  mdlTRIAGEEXT001_BuildOpen—this package invokes the stored procedure that builds the open set
  mdlTRIAGEEXT001_BuildTraining—this package invokes the stored procedure that builds the training set, retrains the model, and refreshes the test set
  mdlTRIAGEEXT001_BuildValidation—this package invokes the stored procedure that builds the validation set
  mdlTRIAGEEXT001_ScoreOpens—this package archives the opens, scores both the opens and the validation set, and calculates the confusion matrix for the validation set.

What is claimed is:
1. A computer-executable method comprising the steps of:
retrieving from a database and validating, by a processor executing a data intake component, input data, said input data representing a claim having an initial risk score and a treatment pattern associated therewith;

loading, by the processor executing the data intake component, the validated input data in a processed data component, wherein the data intake component is coupled to the processed data component and responsive to the retrieving for loading the validated input data in the processed data component;

rendering, by the processor executing a scoring engine, variables for use by a plurality of predictive models, said variables comprising the validated input data and each having an importance score associated therewith based at least in part on a predictive model of the plurality of predictive models to which the variables are to be applied, wherein the scoring engine is coupled to the processed data component;

accessing, by the processor executing the scoring engine, the plurality of predictive models, said plurality of predictive models stored on a memory storage device coupled to the scoring engine;

executing, by the processor executing the scoring engine, the plurality of predictive models as a function of the importance scores of the rendered variables to yield a migratory risk score for the claim, the migratory risk score representing a likelihood of the claim changing during the treatment pattern, said executing comprising independently executing each of the plurality of predictive models in parallel, wherein the scoring engine is responsive to both the loading and the rendering for accessing and executing the plurality of predictive models;

identifying, by the processor executing a report engine, the claim as a migratory claim when the migratory risk score exceeds a predetermined threshold, wherein the report engine is coupled to the scoring engine and responsive to the migratory risk score yielded by the predictive models for identifying the migratory claim;

retrieving from an interventions database, by the processor executing the report engine, at least one intervention linked to the identified migratory claim for altering the treatment pattern to mitigate ongoing claim risk based on the variables;

providing, by the processor executing the report engine, a display including the identified migratory claim and the at least one retrieved intervention, wherein the report engine is responsive to the identifying and the retrieving from the interventions database for providing the display via a communications network to a remotely located computing device;

generating, by the report engine responsive to yielding the migratory risk score, a trend indication, the trend indication representing a prediction trend of the migratory risk score relative to a previously yielded migratory risk score; and providing, by the report engine to the remotely located computing device via the communications network responsive to generating the trend indication, an alert display including the trend indication when the prediction trend is increasing or decreasing.

2. The computer-executable method as recited in claim 1, wherein the input data stored in the database relates to one or more of the following types of data or tables: ICD9 code data, workers compensation claim data, claim payment data, medical/prescription billing data, U.S. census data, Social Security disability data, state regulatory issues data, medical coding data, pharmacy database data, chronic condition data, comorbidity data, ICD9 cross reference tables, NCCI cross reference tables, target variable manipulation tables, claim exclusion tables, and an evidence-based medical treatment crosswalk for comparison to medical bill data.

3. The computer-executable method as recited in claim 1, wherein each of the plurality of predictive models comprises one of the following types of predictive models: a model that identifies claims likely to exceed a self-insured retention or deductible, and a model that identifies claims likely to exceed a predetermined total cost.

4. The computer-executable method as recited in claim 1, further comprising transforming, by the processor executing the scoring engine, the validated input data into model scoring records, said model scoring records representing all relevant variables for the predictive model of the plurality of predictive models to which the variables are to be applied.

5. The computer-executable method as recited in claim 1, wherein retrieving the at least one intervention comprises retrieving specific suggested interventions stored in the intervention database according to risk factor category.

6. The computer-executable method as recited in claim 1, wherein the data intake component, the scoring engine, and the report engine each comprise separate processors, wherein said processors are each coupled to the processed data component, the memory storage device, and to each other.

* * * * *